(12) United States Patent
Van Bockryck et al.

(10) Patent No.: US 10,465,902 B2
(45) Date of Patent: Nov. 5, 2019

(54) COMBINED EVAPORATOR AND MIXER

(71) Applicant: Bosal Emission Control Systems NV, Lummen (BE)

(72) Inventors: Yvo Van Bockryck, Zonhoven (BE); Martijn Luyck, Hasselt (BE); Jean-Paul Hubert Janssens, Leopoldsburg (BE)

(73) Assignee: Bosal Emission Control Systems NV, Lummen (BE)

( * ) Notice: Subject to any disclaimer, the term of this patent is extended or adjusted under 35 U.S.C. 154(b) by 288 days.

(21) Appl. No.: 15/354,642

(22) Filed: Nov. 17, 2016

(65) Prior Publication Data
US 2017/0138588 A1   May 18, 2017

(30) Foreign Application Priority Data
Nov. 18, 2015 (EP) .................... 15195174

(51) Int. Cl.
| | |
|---|---|
| *F22B 1/18* | (2006.01) |
| *F01N 5/02* | (2006.01) |
| *B01B 1/00* | (2006.01) |
| *B01D 1/00* | (2006.01) |
| *B01D 1/06* | (2006.01) |
| *B01D 1/14* | (2006.01) |

(Continued)

(52) U.S. Cl.
CPC ............ *F22B 1/1807* (2013.01); *B01B 1/005* (2013.01); *B01D 1/0058* (2013.01); *B01D 1/065* (2013.01); *B01D 1/14* (2013.01); *B01F 15/066* (2013.01); *C02F 1/16* (2013.01); *F01N 5/02* (2013.01)

(58) Field of Classification Search
CPC .. F22B 1/00; F22B 1/18; F22B 1/1807; F01N 3/00; F01N 3/02; F01N 3/0205; F01N 3/2892; F01N 5/00; F01N 5/02; F28D 7/00; F28F 9/26; F28F 9/262; B01D 1/0058; B01D 1/02; B01D 1/065; B01D 1/14; B01B 1/005; B01F 15/066; B01F 3/04; F02M 15/00; F02M 15/02; F02M 23/00; F02M 31/00; F24F 3/12
USPC .... 165/52, 60, 139, 143, 157, 163; 261/127, 261/133, 150; 123/25 E, 25 F
See application file for complete search history.

(56) References Cited

U.S. PATENT DOCUMENTS

| | | | | |
|---|---|---|---|---|
| 1,795,317 | A | * | 3/1931 | Sengstaken ............... F22D 1/38 122/1 C |
| 2,938,712 | A | * | 5/1960 | Pellmyr .................... F28D 7/06 122/235.11 |
| 3,488,686 | A | | 1/1970 | Dunwoody et al. |

(Continued)

FOREIGN PATENT DOCUMENTS

| | | |
|---|---|---|
| CN | 102914176 A | 2/2013 |
| CN | 203011196 U | 6/2013 |

(Continued)

OTHER PUBLICATIONS

Extended European Search Report for European Patent Application No. 15195174.6, dated Apr. 14, 2016.

*Primary Examiner* — Keith M Raymond
*Assistant Examiner* — Gustavo A Hincapie Serna
(74) *Attorney, Agent, or Firm* — Merchant & Gould P.C.

(57) ABSTRACT

A Combined evaporator and mixer for evaporating a liquid, particularly water, and mixing with a gas, particularly natural gas, including a housing and at least one individual mixing-evaporation module having exhaust gas openings at two of its ends.

15 Claims, 8 Drawing Sheets

(51) Int. Cl.
*B01F 15/06* (2006.01)
*C02F 1/16* (2006.01)

(56) References Cited

U.S. PATENT DOCUMENTS

| | | | | |
|---|---|---|---|---|
| 3,559,722 | A | * | 2/1971 | Schauls ............ F25J 5/002 |
| | | | | 165/166 |
| 4,036,293 | A | | 7/1977 | Tank et al. |
| 4,253,516 | A | | 3/1981 | Giardina |
| 4,592,416 | A | | 6/1986 | Mattison et al. |
| 4,676,305 | A | | 6/1987 | Doty |
| 4,973,778 | A | * | 11/1990 | Harandi ............ C10G 35/095 |
| | | | | 208/140 |
| 5,186,240 | A | * | 2/1993 | Kennon ............ F28G 3/166 |
| | | | | 134/172 |
| 6,531,102 | B1 | * | 3/2003 | Nakamura ............ B01B 1/005 |
| | | | | 422/198 |
| 7,779,899 | B2 | * | 8/2010 | Jibb ............ F25J 3/04284 |
| | | | | 165/140 |
| 9,819,044 | B2 | * | 11/2017 | De Vos ............ H01M 8/0625 |
| 9,831,506 | B2 | * | 11/2017 | Yoshimine ............ C01B 3/384 |
| 2003/0211021 | A1 | | 11/2003 | Oi et al. |
| 2005/0026011 | A1 | | 2/2005 | Suzuki et al. |
| 2009/0155141 | A1 | | 6/2009 | Arai et al. |
| 2009/0260786 | A1 | | 10/2009 | Palanchon |
| 2010/0258112 | A1 | * | 10/2010 | Viskup, Jr. ............ F22B 1/006 |
| | | | | 126/645 |
| 2014/0102667 | A1 | * | 4/2014 | De Vos ............ C01B 3/386 |
| | | | | 165/52 |
| 2017/0058742 | A1 | * | 3/2017 | Zhang ............ F01N 3/2046 |

FOREIGN PATENT DOCUMENTS

| | | |
|---|---|---|
| DE | 3533196 A1 | 3/1987 |
| DE | 10303497 A | 8/2004 |
| DE | 102011119117 A1 | 5/2013 |
| EP | 0046600 A1 | 3/1982 |
| EP | 2131131 A1 | 12/2009 |
| EP | 2682677 A1 | 1/2014 |
| FR | 2863044 A1 | 6/2005 |
| GB | 2065860 A | 7/1981 |
| JP | 2001-132901 A | 5/2001 |
| JP | 2011-85369 A | 4/2011 |
| NL | 1019777 C1 | 7/2003 |
| WO | 2011/060936 A2 | 5/2011 |
| WO | 2012/117621 A1 | 9/2015 |

* cited by examiner

COMBINED EVAPORATOR AND MIXER

This application claims benefit of Serial No. 15195174.6, filed on 18 Nov. 2015 in the European Patent Office and which application is incorporated herein by reference. To the extent appropriate, a claim of priority is made to the above disclosed application.

The invention relates to a combined evaporator and mixer and a method for evaporating a liquid and mixing with a mixing gas using the combined evaporator and mixer.

Heat exchangers are known in various fields of applications, for example air-conditioning, in heating's or in heat recuperators of gas turbines, as well as in many further fields of application.

Heat exchangers are also used, for example, to extract heat out of exhaust and bring it into the ranking cycle fluid. In particular in internal combustion engines, the heat of the hot exhaust gas stream which exits the engine is used to pre-heat the input gas stream by means of a heat exchanger.

EP 2 131 131 A1 deals with a heat exchanger comprising a group of tubes the one ends of which are connected to a first manifold and the other ends of which are connected to a second manifold. Each group of tubes forms a module and adjacently arranged modules are connected to one another through a connecting channel piece. However, such known heat exchanger is not suited for simultaneously evaporating a liquid and mixing with a mixing gas.

Heat exchangers known in the art are suited for heating a gas or evaporating a liquid, but simultaneous introduction of a liquid and a gas into the heat exchanger will result in poor mixing quality, as the gas introduced at the same time as the liquid to be evaporated will form bubbles which will rise to the top of the heart exchanger whereas the liquid will remain at the bottom of the heat exchanger and block the heat exchanging tubes, preventing the introduced gas from traveling along the heat exchanging tube.

Therefore, it is an object of the present invention to provide a heat exchange apparatus which is simple in construction, allowance simple testing for quality analysis and which avoids the disadvantages mentioned above. Furthermore, an additional object of the present invention is to provide a method for simultaneous evaporation of a liquid and mixing the evaporated liquid with a mixing gas using the combined evaporator and mixer according to the invention.

This object is achieved by a heat exchanger as it is specified by the features of independent claim 1. Further embodiments of the said heat exchanger are the subject of the dependent claims.

In particular, the combined evaporator and mixer for evaporating a liquid, particularly water, and mixing with a gas, particularly natural gas, according to the invention comprises a housing for receiving individual mixing-evaporation modules. The housing has heating gas openings at two of its ends for allowing hot gas to pass through the mixing-evaporation modules. The combined evaporator and mixer further comprises at least one individual mixing-evaporation module having exhaust gas openings at two of its ends. The mixing-evaporation module comprises at least one mixing-evaporation stack, and the mixing-evaporation stack have at least two individual heat transfer cells comprising a first heat transfer cell and a last heat transfer cell. The at least two individual heat transfer cells comprise a plurality of heat transfer tubes, each heat transfer tube having a tube inlet and a tube outlet. The tube inlets of the plurality of heat transfer tubes are connected to an inlet manifold and the tube outlets of the plurality of heat transfer tubes are connected to an outlet manifold. The heat transfer tubes are laterally adjacently arranged in at least one heat transfer tube row, the at least two heat transfer cells are arranged one beside the other in at least two laterally adjacent heat transfer cell rows, and the manifolds of adjacently arranged heat transfer cells are connected to one another through at least one connecting channel piece in a manner so as to form a series arrangement of heat transfer cells forming a mixing-evaporation stack. The mixing-evaporation stack further comprises at least one liquid inlet to the first heat transfer cell, for the liquid to be evaporated, as well as at least one mixing gas inlet for introducing a gas to be mixed with the evaporated liquid into the mixing-evaporation stack, and at least one mixed gas outlet for the gaseous fluid mixture to leave the mixing-evaporation stack. The mixing gas inlet is arranged between the heat transfer tube outlets of the first heat transfer cell and the heat transfer tube inlets of the last heat transfer cell of each mixing-evaporation stack.

The inlets and outlets being arranged on the mixing-evaporation stack or its parts means that they are connected to the mixing-evaporation stack or its parts. Arranged on or connected to also means that the inlets or outlets are in fluid connection with the mixing-evaporation stack or its parts.

The mixing gas inlet is in particular arranged on (connected to or in fluid connection with) the mixing-evaporation stack at a location between the heat transfer tube outlets of the first heat transfer cell and the heat transfer tube inlets of the last heat transfer cell of each mixing-evaporation stack.

The mixed gas outlet is connected to the outlet manifold of the last heat transfer cell in order to allow the gaseous fluid mixture to leave the mixing-evaporation stack.

In this configuration, the heat transfer cells are arranged laterally adjacently one beside the other. Each heat transfer cell row is formed by one heat transfer cell. Therefore, the number of heat transfer cell rows in the mixing-evaporation stack corresponds to the number of heat transfer cells in the corresponding mixing-evaporation stack.

The rows may be arranged such that the at least two heat transfer cells are arranged one beneath the other with respect to the hot gas flow passing the combined evaporator and mixer in operation. In this configuration, the hot gas will first pass the last heat transfer cell before passing the preceeding heat transfer cell until passing the first heat transfer cell.

The number of heat transfer cells may exceed the number of two, in which case the mixing gas inlet may still be arranged on (connected to or in fluid connection with) the mixing-evaporation stack at a location between the heat transfer tube outlets of the first heat transfer cell and the heat transfer tube inlets of the last heat transfer cell of each mixing-evaporation stack. In particular, in case of three heat transfer cells, the mixing gas inlet may be arranged on the mixing-evaporation stack at a location between the heat transfer tube outlets of the first heat transfer cell and the heat transfer tube inlets of the second heat transfer cell, or at a location between the heat transfer tube outlets of the second heat transfer cell and the heat transfer tube inlets of the last heat transfer cell. The location of the mixing gas inlet depends particularly on the configuration of the combined evaporator and mixer and on the temperature of the hot gas when the combined evaporator and mixer is in operation. These considerations hold also for a number of heat transfer cells exceeding three.

The hierarchical construction of the combined evaporator and mixer with individual mixing-evaporation modules which are insertable in the housing, the mixing-evaporation modules comprising individual mixing evaporation stacks themselves comprising individual heat transfer cells, each individual heat transfer cell comprising a plurality of heat transfer tubes allows to easily test each heat transfer cell, each mixing-evaporation module stack and each individual mixing-evaporation module forming the combined evaporator and mixer separately. The testing will show the working capability of each individual part tested and in case the part tested is found to be leaking or otherwise inoperable, it can be either repaired or exchanged by another corresponding part or module that will work since all sub parts or sub modules may be stored or rapidly procured. Accordingly, it is possible to assemble an entire individual mixing-evaporation module that will work prior to assembly of the mixing-evaporation modules and introduction into the housing for forming the combined evaporator and mixer due to the hierarchical modularity and assembly of the combined evaporator and mixer. In particular, testing and validation of the individual mixing-evaporation stacks before being assembled to form the next hierarchical level of the assembly has proven to be particularly efficient during construction of the combined evaporator and mixer. Indeed, the mixing-evaporation stack comprising at least two individual heat transfer cells, the heat transfer cells may be of the smallest entity which may be exchanged with low efforts and costs, in case the testing and validation of the individual mixing-evaporation stack indicated a defective heat transfer cell, the specific and individual heat transfer cell may be exchanged by another one. Once the defective heat transfer cell has been removed from the mixing-evaporation stack, of this heat transfer cell may be repaired by exchanging the corresponding defective heat transfer tube within the heat transfer cell.

Furthermore, the combined evaporator and mixer according to the invention allows for very efficient evaporation of a liquid fluid and mixing with a gaseous fluid to form a mixed gas in one apparatus. The liquid, particularly deionized water, is introduced into the first heat transfer cell and evaporation of the liquid will take place in the first cell(s) and the introduction of the mixing gas occurs at the inlet of a subsequent heat transfer cell of the mixing-evaporation stack, particularly at a stage wherein the liquid is completely evaporated. The introduction of the mixing gas, depending on constructional and operational conditions, may occur already after the first heat transfer cell of the mixing-evaporation stack, or after a second or third heat transfer cell (and so on) of the mixing-evaporation stack. As such, of the combined evaporator and mixer according to the invention allows for simultaneous evaporation of a liquid and efficient mixing the evaporated liquid with a gas in one apparatus with no need of additional components.

The tube outlets of each heat transfer tube in the heat transfer cell are connected to an outlet manifold, which in turn is connected to an inlet manifold connected to the tube inlets of each heat transfer tube of the subsequent heat transfer cell in the mixing-evaporation stack via at least one connecting channel piece. This arrangement allows for enhanced mixing—in case the liquid is not entirely evaporated when leaving the preceding heat transfer cell—of the evaporated liquid and remaining liquid or—in case the mixing gas is introduced into the mixing-evaporation stack at this stage—of the evaporated liquid and mixing gas for uniform distribution of the fluids entering the heat transfer tubes of the subsequent heat transfer cell in the mixing-evaporation stack.

The hierarchical construction of the combined evaporator and mixer allows for a very efficient and modular manufacture and assembly. Such modularity allows for building a combined evaporator and mixer with high capacity (for example 1 MWth) using a plurality of individual, but identical stacks (for example 42 identical stacks). The stacks can be tested and validated in a first step by a leakage testing with high pressure under cold conditions, for example, and in a subsequent step by placing the stacks over a burner and introducing a liquid (e.g. water) and a gas (e.g. air) and measuring various parameters (eg. pressure drop, temperatures), if necessary by cycles at certain temperatures, for example. Once the stacks are validated, the stacks are assembled to modules and eventually themselves assembled to form a high capacity combined evaporator and mixer. This hierarchical modularity allows for the production of various high capacity combined evaporator and mixer using a high number of identical parts permitted by the device according to the invention.

The hot gas used for heating up the mixing-evaporation modules and the fluids circulating of air in generally come from a gas burner or a diesel engine.

In accordance with another aspect of the invention, the mixing gas inlet arranged on (connected to or in fluid connection with) the mixing-evaporation stack on at least one connecting channel piece, preferably on the at least one connecting channel piece connecting one heat transfer cell to the adjacent heat transfer cell.

In particular, in case of three heat transfer cells, the mixing gas inlet may be arranged on the at least one connecting channel piece connecting the first heat transfer cell to the second heat transfer cell, or on the at least one connecting channel piece connecting the second heat transfer cell to the third heat transfer cell. The location of the mixing gas inlet depends particularly on the configuration of the combined evaporator and mixer and on the temperature of the hot gas when the combined evaporator and mixer is in operation. These considerations hold also for a number of heat transfer cells exceeding three.

In accordance with still a further aspect of the invention, the combined evaporator and mixer comprises at least two individual mixing-evaporation modules.

In the advantageous aspect of the invention, the use of two or more individual mixing-evaporation modules allows to have one redundant mixing-evaporation module. A redundant mixing-evaporation module is particularly advantageous in case one mixing-evaporation module becomes damaged, e.g. leakage, during operation of the combined evaporator and mixer. During operation, the serviceability of a combined evaporator and mixer according to the invention generally will be monitored by measuring pressure drop, leakage or temperatures. When the monitoring detects a defective mixing-evaporation module, this individual module may be shut down and the production of mixed gas is switched to the redundant mixing-evaporation module which operation is started by feeding with liquid to be evaporated and mixing gas. The defective mixing-evaporation module which has been shut down may then be exchanged by a new or a repaired mixing-evaporation module. This exchange may be done either by introducing a mixing-evaporation module which is in stock or by introducing the same mixing-evaporation module after having been repaired. The system may therefore remain in operation, without downtime and the defective module can be replaced during the next scheduled maintenance, or at any convenient time.

According to a further aspect of the combined evaporator and mixer according to the present invention, the liquid inlet, the mixing gas inlet and the mixed gas outlet are arranged on the respective inlet manifold or outlet manifold or on the connecting channel piece. In particular, the liquid inlet is arranged on the inlet manifold, the mixing gas inlet is arranged on at least one connecting channel piece connecting one heat transfer cell to the adjacent heat transfer cell and the mixed gas outlet is arranged on the outlet manifold.

This arrangement is advantageous regarding standardization of the components to be assembled, thereby reducing the complexity of the manufacture as well as the assembling of the parts to form the mixing-evaporation stack. Indeed, this construction is advantageous regarding assembly sequence and accessability of the different parts during welding step.

In accordance with a further aspect of the combined evaporator and mixer according to the invention, the heat transfer tubes of the respective heat transfer cell are U-shaped, and the outlet manifold of the respective heat transfer cell is arranged adjacently to the inlet manifold of the same heat transfer cell.

Although the heat exchanger tubes of the respective heat exchanger cell may extend in an essentially longitudinal direction such that the one ends of these tubes are connected to an upper manifold while the other ends of these tubes are connected to a lower manifold, the heat transfer tubes may advantageously be essentially U-shaped with the one of the U-shaped tubes being connected to a first upper manifold (inlet manifold) while the other ends of the U-shaped tubes being connected to a second upper manifold (outlet manifold). The second upper manifold (outlet manifold) of the respective heat transfer cell is arranged in front of or behind the first upper manifold of this heat transfer cell, respectively. In addition, the second upper manifold (outlet manifold) of the respective heat transfer cell is connected to the first upper manifold (inlet manifold) of the subsequent heat transfer cell or to the first upper manifold (inlet manifold) of the preceding heat transfer cell, respectively. This alternative construction with the heat transfer tubes having a U-shape is an advantageous with regard to stress due to term expansion which can be compensated for by a simultaneous elongation of the two legs of the U-shaped heat transfer tubes in the longitudinal direction. This elongation of the legs of the U-shaped heat transfer tubes is not constrained since the tubes are not welded to a manifold at their lower end. Adjacent tubes at the same cell might be at a different temperature, and can expand to a different length without introducing stresses in the other tubes.

In another aspect of the combined evaporator and mixer according to the invention, the liquid inlet and the mixing gas inlet are connectable to corresponding distribution manifolds and the mixed gas outlet is connectable to a mixed gas collector. The distribution manifolds and the mixed gas collector are situated outside of the mixing-evaporation module.

The arrangement of the distribution manifolds and the mixed gas collector outside of the mixing-evaporation module allows for easy operation and exchange process in case of shut down of a defective mixing-evaporation stack and/or switching to a redundant mixing-evaporation stack. Additionally, the access to the distribution manifolds and to the mixed gas collector for maintenance are facilitated.

Advantageously, the connecting pipes connecting the liquid inlet and the mixing gas inlet to the corresponding distribution manifolds as well as the connecting pipe connecting the mixed gas outlet to the mixed gas collector are arranged in the mixing-evaporation module such that in operation the connecting pipes are in contact with the hot gas, either before the hot gas crosses the mixing-evaporation stack or after the hot gas crosses the mixing-evaporation stack. The connecting pipes of the liquid inlet and of the mixing gas inlet are particularly arranged after the hot gas crosses the mixing-evaporation stack. This arrangement allows for a pre-heating of the cold liquid and the cold mixing gas before entering the mixing-evaporation stack. The connecting pipe of the mixed gas outlet is particularly arranged before the hot gas crosses the mixing-evaporation stack, thereby further heating the formed mixed gas.

According to a further aspect of the combined evaporator and mixer according to the invention, the connections of the liquid inlet and the mixing gas inlet to the corresponding distribution manifolds and the connection of the mixed gas outlet to the mixed gas collector of each individual mixing-evaporation module which are situated outside of the mixing-evaporation module and are capable of being shut off for each mixing-evaporation module independently.

This arrangement advantageously allows for individual shut down and/or individual operation start for example of a redundant mixing-evaporation module when the monitoring detects a defective mixing-evaporation module which has to be exchanged or repaired. This individual module may be shut down by actuating valves situated at the connection between the liquid inlet and the mixing gas inlet and the corresponding distribution manifolds and between the mixed gas outlet and the mixed gas collector. The start of the operation of the redundant mixing-evaporation module is started by actuating corresponding valves, thereby feeding the redundant module with liquid to be evaporated and mixing gas. The defective mixing-evaporation module which has been shut down may then be exchanged by a new or a repaired mixing-evaporation module, thereby optimally using the hierarchical modularity of the combined evaporator and mixer according to the invention.

In accordance with yet another aspect of the combined evaporator and mixer according to the invention, the liquid inlet, mixing gas inlet and mixed gas outlet are arranged on the same side of the mixing-evaporation module.

Although the inlets and outlets of the mixing-evaporation modules may be arranged on different sides of the mixing-evaporation module, it is advantageous to arrange the inlets and outlets of the mixing-evaporation modules on the same side. This aspect of the invention will simplify the handling of the mixing-evaporation modules in particular during installation of a mixing-evaporation module, switching operation to a redundant mixing-evaporation module or exchange of a mixing-evaporation module.

According to a further aspect of the invention, the combined evaporator and mixer, the housing comprises openings in a sidewall of the housing adjacently to the heating gas openings for inserting or removing the mixing-evaporation modules independently. The housing comprises rails for receiving the mixing-evaporation modules arranged so to enable insertion and removal of the mixing-evaporation modules.

The openings in the sidewall of the housing and the rails allow for very efficient, fast and accurate position and introduction and removal of the mixing-evaporation modules into and out of the housing.

In accordance with still a further aspect of the combined evaporator and mixer according to the invention, the mixing-evaporation stacks are arranged in the mixing-evaporation modules so to form an angle $\alpha$ of from 0° to 45° with the exhaust gas openings of the mixing-evaporation modules.

When the mixing-evaporation stacks form an angle $\alpha$ of from 0° to 45° with the exhaust gas openings of the mixing-evaporation modules, the flow of the hot gas passing through the mixing-evaporation modules is efficiently guided along the walls of the heat transfer tubes of each heat transfer cell, resulting in better heat exchange between the hot gas and the fluids circulating through the heat transfer tubes. Indeed, in this arrangement the flow of the hot gas is more evenly distributed over the complete individual heat transfer stacks.

In accordance with a further aspect of the combined evaporator and mixer according to the invention, two mixing-evaporation stacks are arranged to form a V-shape stack-pair. The two mixing-evaporation stacks of the V-shape stack-pair may be connected to one another in a leak-tight manner. In particular, the two mixing-evaporation stacks of the V-shape stack-pair may be connected to one another by a deflector.

The deflector closes the gap at the bottom of the V-shape stack-pair, thereby forcing the hot gas to pass along the heat transfer tubes. The deflector particularly guides the gas to the desired flow path, i.e. through the respective mixing-evaporation stack. In particular, the deflector is a bent plate of metal which is connected, particularly in a leak-tight manner, to the respective mixing-evaporation stack. The bent plate is particularly arranged such that it does not introduce stress onto the tubes in the respective mixing-evaporation stack.

In another aspect of the invention of the combined evaporator and mixer, at least two stack-pairs are arranged in the mixing-evaporation module to form a W-shape assembly of at least four mixing-evaporation stacks. The two stack-pairs of the W-shape assembly may particularly be connected to one another in a leak-tight manner. For the purpose of leak-tight connection at the top of the mixing-evaporation stack, a small plate may be mounted at the top of the central legs or of each leg of the W-shaped arrangement, thereby closing for example the gap between adjacent stack-pairs at the location the central legs meet.

Combining two mixing-evaporation stacks to form a V-shape stack-pair as well as combining to V-shape stack-pairs to form a W-shape assembly allows for very efficient use of the heat energy of the hot gas flow and a very compact architecture of the combined evaporator and mixer.

In a further aspect of the combined evaporator and mixer according to the invention, the mixing gas inlet comprises an ejector.

The use of at least one ejector for the introduction of the mixing gas into the combined evaporator and mixer regulates the gas flow and enhances the mixing efficiency, hence allowing smaller sized mixing-evaporation stacks when compared to a simple introduction of the mixing gas into the combined evaporator and mixer, in which case the mixing has to be pursued in the respective heat transfer cell. Furthermore, the ejector is a very simple mixing device which can be easily introduced into the combined evaporator and mixer and its efficiency is such that a mix of multiple mixing gases is possible.

Also in accordance with the invention, the method for evaporating a liquid and mixing the evaporated liquid with a mixing gas, wherein the step of evaporation and mixing is performed by using a combined evaporator and mixer according to the invention. The liquid to be evaporated is introduced into a first heat transfer cell of the respective mixing-evaporation stack in the mixing-evaporation module and the mixing gas is introduced after the first heat transfer cell and before the last heat transfer cell. The mixing-evaporation module is heated by a hot gas stream, particularly an exhaust gas stream.

Particularly, the heating gas for heating the liquid to be evaporated and the mixing gas is generated by the hot cathode gas, that comes out of the fuel cell stack. It can be heated also, by a burner if the gas temperature is too low.

According to one aspect of the method according to the invention, the liquid to be evaporated is water, particularly deionized water, and the mixing gas is natural gas.

According to a further aspect of the method according to the invention, a mixed gas outlet comprising evaporated liquid and mixing gas leaving the combined evaporator and mixer are introduced into a reformer.

According to another aspect of the method according to the invention, the hot gas enters the mixing-evaporation stack by passing along the heat transfer tubes of the last heat transfer cell, thereby heating up the gaseous fluid mixture and exits the mixing-evaporation stack by passing along the heat transfer tubes of the first heat transfer cell, thereby heating up the liquid to be evaporated.

The advantages of the method according to the invention and of the various embodiments thereof correspond to those already discussed above in connection with the combined evaporator and mixer according to the invention and the various corresponding embodiments. Therefore, although some of the embodiments of the method according to the invention are explicitly mentioned, the advantages of the corresponding embodiment of the device are not reiterated.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

The invention is further described with regard to embodiments, which are illustrated by means of the following drawings, wherein.

Figure 1:
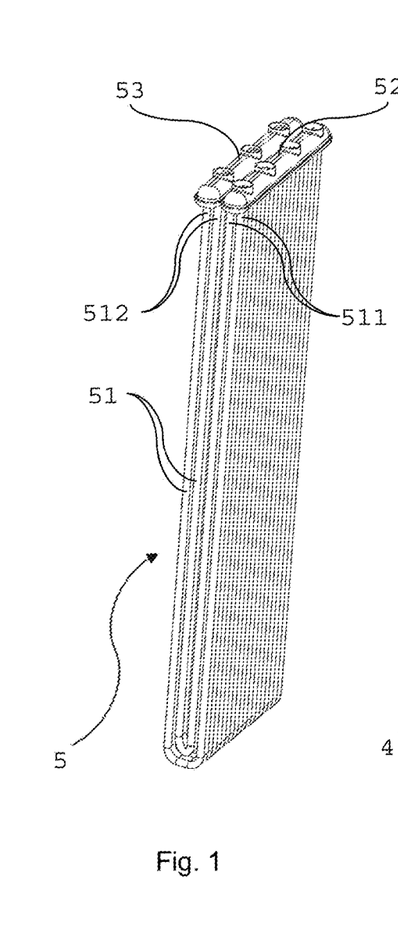
FIG. 1 shows a perspective view of a first embodiment of a heat transfer cell according to the invention.

FIG. 1 shows an embodiment of an individual heat transfer cell 5 according to one embodiment of the invention. The individual heat transfer cell 5 shown in FIG. 1 is in an assembled state and comprises a plurality of U-shaped heat transfer tubes 51 and to upper manifolds 52, 53. Within one individual heat transfer cell 5, the respective ends of the U-shaped tubes 511, 512 are connected to the first upper manifold 52 and to the second upper manifold 53 of the heat transfer cell 5. The first and second upper manifolds 52, 53 are arranged on respective upper flanges of each respective U-shaped tube 51.

The individual heat transfer cell 5 comprises a row of laterally adjacently arranged heat transfer tubes 51 having the aforementioned U-shaped. In the embodiment shown, the heat transfer cell 5 comprises two rows of U-shaped heat transfer tubes 51, an "outer" row of heat transfer tubes, and an "inner" row of heat transfer tubes. As can be seen, the ends of each heat transfer tube 511, 512 are connected to the first and second manifolds 52, 53 laterally offset (staggered) relative to one another.

Figure 2:
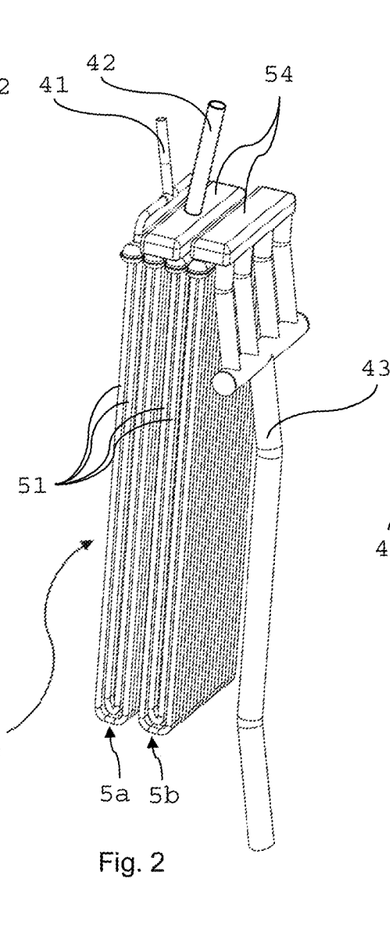
FIG. 2 shows a perspective view of a heat transfer stack according to an embodiment of the invention.

The FIG. 2 shows a mixing-evaporation stack 4 in its assembled state comprising two individual heat transfer cells 5, a first heat transfer cell 5a and a last heat transfer cell 5b, with each individual heat transfer cell 5 comprising a plurality of U-shaped heat transfer tubes 51 arranged in two heat transfer tube rows and two upper manifolds 52, 53. The two individual heat transfer cells 5 are arranged one after the other and one beside the other in two laterally adjacent heat transfer cell rows to form the mixing-evaporation stack 4. It will be evident to the person skilled in the art, that the mixing-evaporation stack 4 may comprise more than two individual heat transfer cells 5, in particular three or more individual heat transfer cells 5.

Also, guiding plates (not shown) may be provided within the mixing-evaporation stack 4 which allow for additional stability of the individual heat transfer cells 5 (since the U-shaped tubes 51 may have considerable lengths) and which guide the tubes during thermal expansion so that they expand in the longitudinal direction. Additionally, the guiding plates ensure that the hot gas passes the mixing-evaporation stack 4 over its entire length, thereby enhancing the distribution of the hot gas flow. This is done by blocking the flow of the hot gas parallel to the heat transfer tubes 51, and force the flow perpendicular to the heat transfer tubes 51.

The guiding plates of the first individual heat transfer cell 5 may be connected to the guiding plates of the second individual heat transfer cell 5—and so on in case more than two heat transfer cells 5 are present in the mixing-evaporation stack 4—for example with welding spots. This allows for additional stability of the entire mixing-evaporation stack 4.

The mixing-evaporation stack 4 further comprises a liquid inlet 41 to the first heat transfer cell 5a, for the liquid, e.g. water, to be evaporated as well as a mixing gas inlet 42 for introducing a gas to be mixed with the evaporated liquid into the mixing-evaporation stack 4, and a mixed gas outlet 43 for the gaseous fluid mixture to leave the mixing-evaporation stack 4. As can be seen from FIG. 2, a first upper manifold 52 of the first heat transfer cell 5a is connected to the liquid inlet 41 and to the tube inlets 511 of the plurality of heat transfer tubes 51 of the first heat transfer cell 5a and the second upper manifold 53 of the first heat transfer cell 5a is connected to the tube outlets 512 of the plurality of heat transfer tubes 51 of the first heat transfer cell 5a. The second upper manifold 53 of the first individual heat transfer cell 5 is then connected to the first upper manifold 52 of the second individual heat transfer cell 5 which is arranged behind the first individual heat transfer cell 5 through a connecting channel piece 54. In case there is a third heat transfer cell, it will be connected the same way to the second heat transfer cell 5. Thus, a series arrangement of individual heat transfer cells 5 is formed.

The individual heat transfer cells 5 within the mixing-evaporation stack 4 are connected to one another with connecting channel pieces 54, which connect the tube outlets 512 of the plurality of heat transfer tubes 51 either to the tube inlets 511 of the subsequent plurality of heat transfer tubes 51 or to the mixed gas outlet 43 for the gaseous fluid mixture to leave the mixing-evaporation stack 4.

The mixing gas inlet 42 is connected to the connecting channel piece 54 arranged between and connecting the heat transfer tube outlets 512 via the second upper manifold 53 of the first heat transfer cell 5a and the heat transfer tube inlets 511 via the first upper manifold 52 of the second (and last) heat transfer cell 5b of each mixing-evaporation stack 4 on the connecting channel piece 54 connecting the first heat transfer cell 5a with the second (and last) heat transfer cell 5b.

Figure 3:
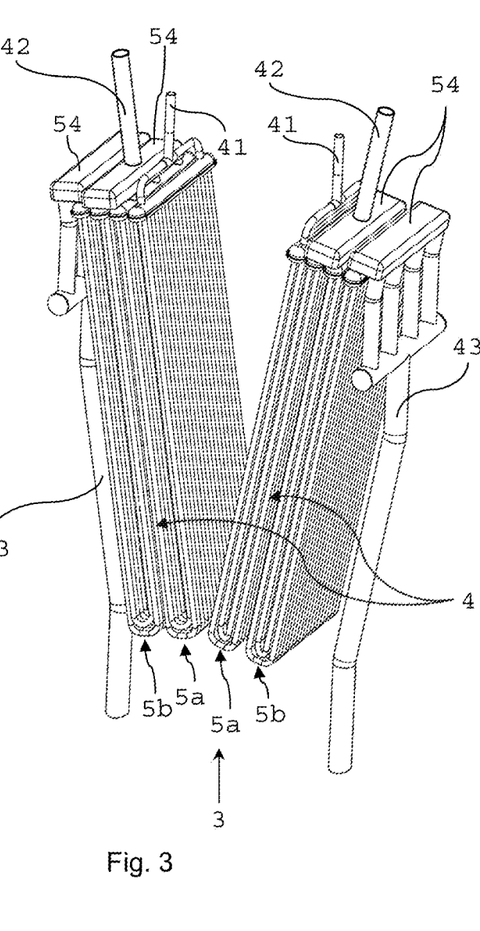
FIG. 3 shows a perspective view of two mixing-evaporation stacks according to FIG. 2 arranged to form a V-shape stack-pair.

FIG. 3 shows a pair of mixing-evaporation stacks 4 to be arranged in the mixing-evaporation module 1 to form a V-shape stack-pair and forming an angle α of about 10° with the exhaust gas openings of the mixing-evaporation modules 1.

Figure 4:
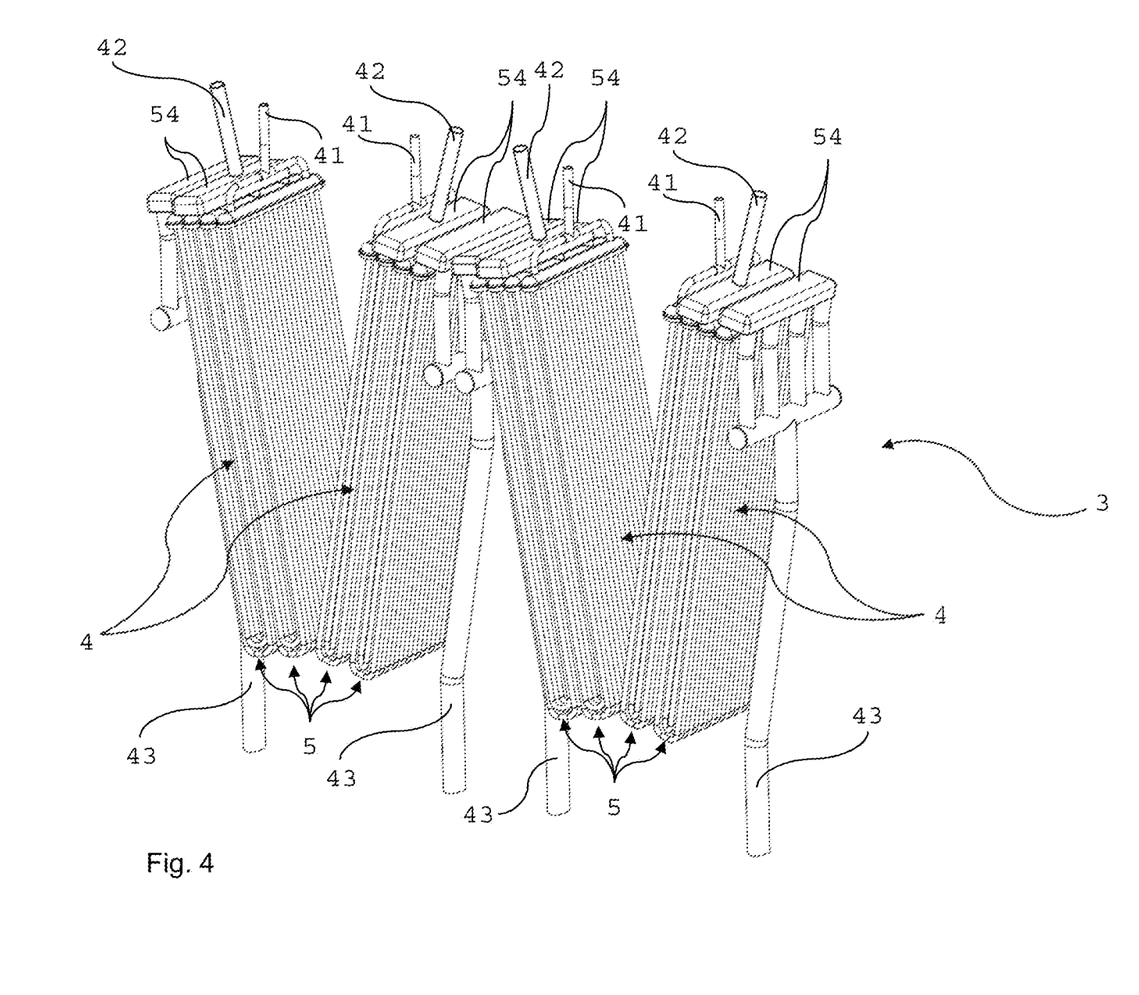
FIG. 4 shows a perspective view of two stack-pairs sown in FIG. 3 arranged in the mixing-evaporation module to form a W-shape assembly of four mixing-evaporation stacks.

FIG. 4 shows a further embodiment, wherein two stack-pairs are arranged in the mixing-evaporation module 1 to form a W-shape assembly of four mixing-evaporation stacks 4.

These figures show the hierarchical modularity of the present invention.

Figure 5:
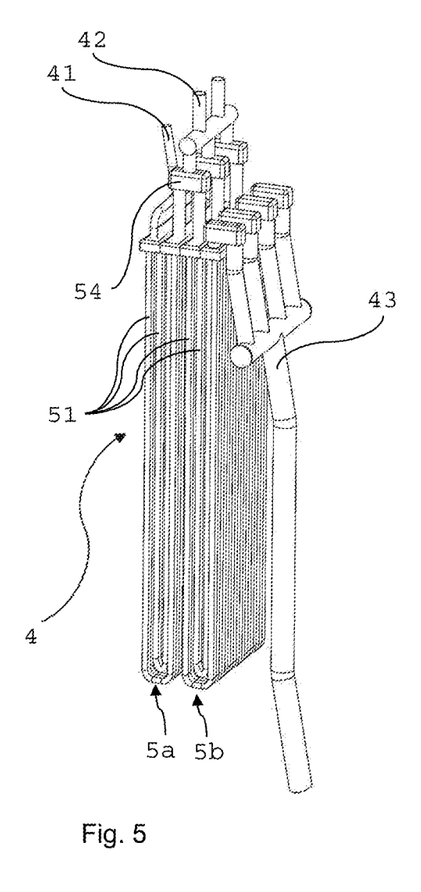
FIG. 5 shows a perspective view of a second embodiment of a heat transfer stack according to the invention comprising an ejector.

In another embodiment similar to the mixing-evaporation stack 4 comprising two individual heat transfer cells 5 depicted in FIG. 2 comprising a first heat transfer cell 5a and a last heat transfer cell 5b, the embodiment shown in FIG. 5 differing in that the mixing gas inlet 42 comprises three connecting channel pieces 54 connecting the heat transfer tube outlets 512 of the first heat transfer cell 5a with the heat transfer tube inlets 511 of the second (and last) heat transfer cell 5b of each mixing-evaporation stack 4. An ejector 6 working according to the Venturi principle for suction of the mixing gas into a mixing chamber is used for the introduction of the mixing gas into the mixing-evaporation stack 4. The mixing gas inlet 42 is connected via the ejector 6 to the mixing-evaporation stack 4 on each of the three connecting channel pieces 54 connecting the first heat transfer cell 5a to the adjacent second (and last) heat transfer cell 5b.

Figure 6:
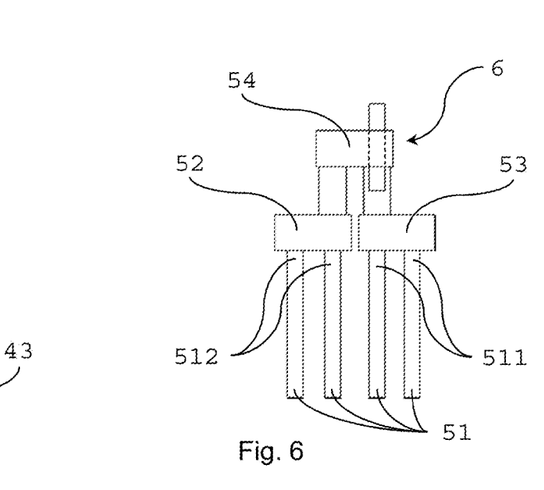
FIG. 6 shows a sectional view of one embodiment of the ejector according to the invention.
Figure 8:
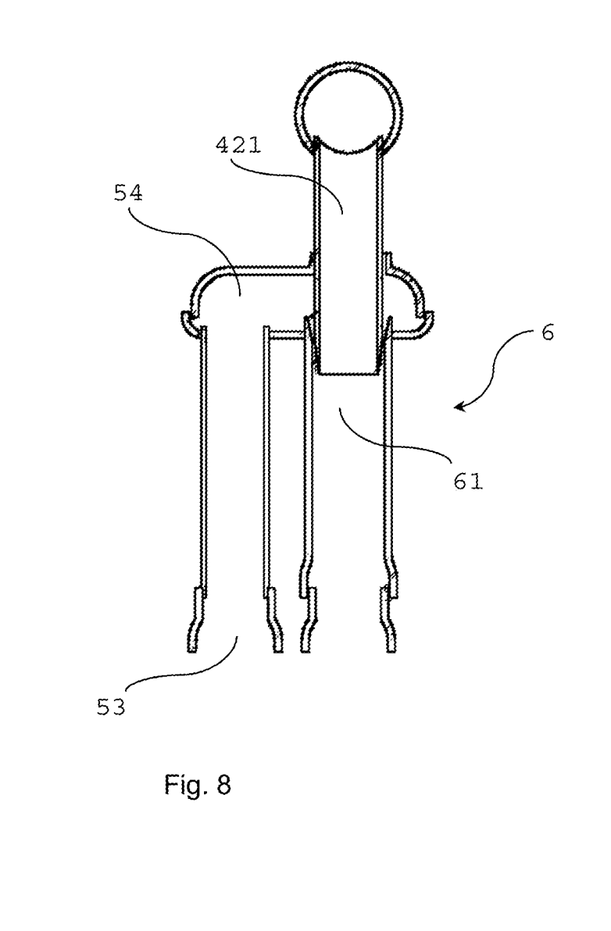
FIG. 8 shows a sectional view of another embodiment of the ejector according to the invention.

FIG. 6 and FIG. 8 show detailed cross-section drawings of two embodiments of the ejector 6. In the embodiments shown in the figures, the mixing gas inlet 42 comprises a mixing gas inlet tube 421 which extends into the mixing chamber 61 of the ejector. The mixing gas inlet tube 421 is surrounded by the connecting channel piece 54 in the mixing chamber leading the evaporated fluid EF around the mixing gas inlet tube 421 towards the inlet manifold 52 of the subsequent heat transfer cell 5.

Figure 7:
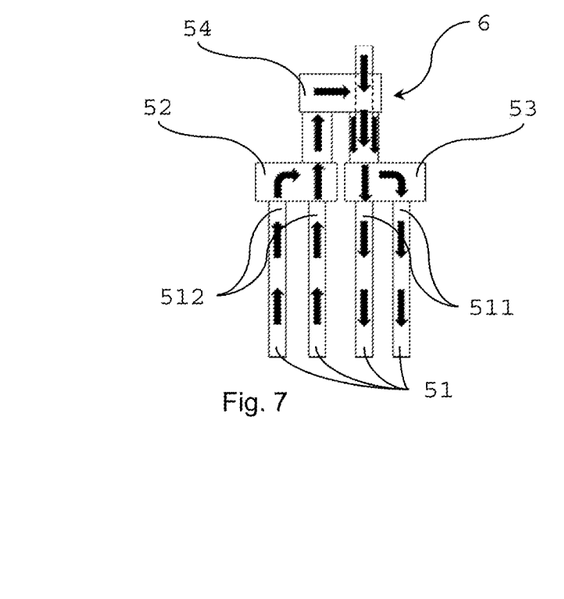
FIG. 7 shows the working principle of the ejector according to FIG. 6.
Figure 9:
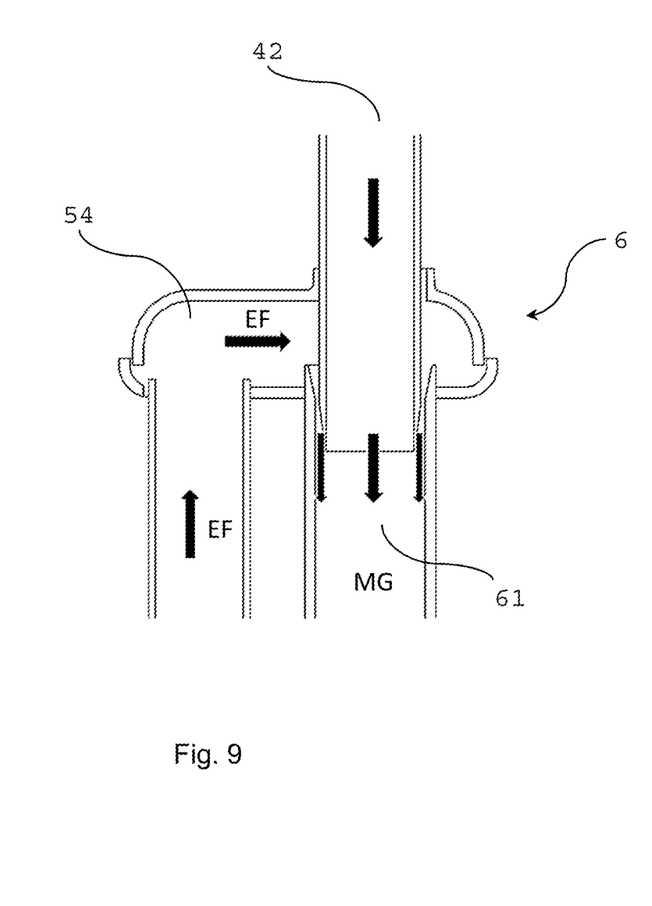
FIG. 9 shows the working principle of the ejector according to FIG. 8.

From the sectional views of the ejectors shown in FIG. 7 and FIG. 9, the working principle of the ejector 6 becomes evident. Due to the construction of the ejector 6, the evaporated fluid EF passing around the mixing gas inlet tube 421 will result in a velocity difference between the evaporated fluid EF and the mixing gas, hence in a difference of pressure through which the mixing gas is sucked through the mixing gas inlet tube 421 into the mixing chamber 61 of the ejector previous to entering the inlet manifold 52.

Figure 10:
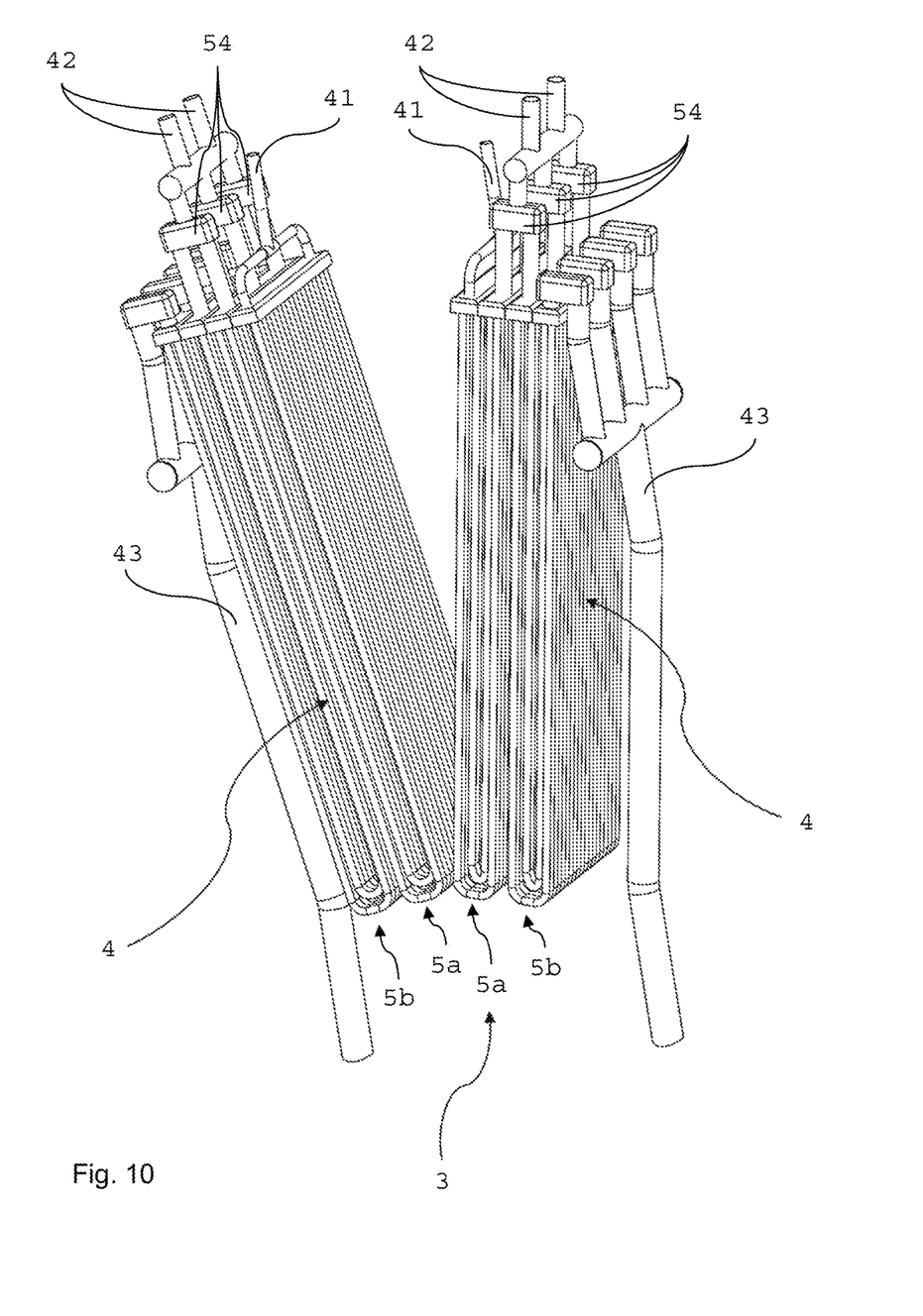
FIG. 10 shows a perspective view of two mixing-evaporation stacks according to FIG. 9 arranged to form a V-shape stack-pair.

FIG. 10 shows a pair of mixing-evaporation stacks 4 to be arranged in the mixing-evaporation module 1 to form a V-shape stack-pair and forming an angle α of about 20° with the exhaust gas openings of the mixing-evaporation modules 1.

Figure 11:
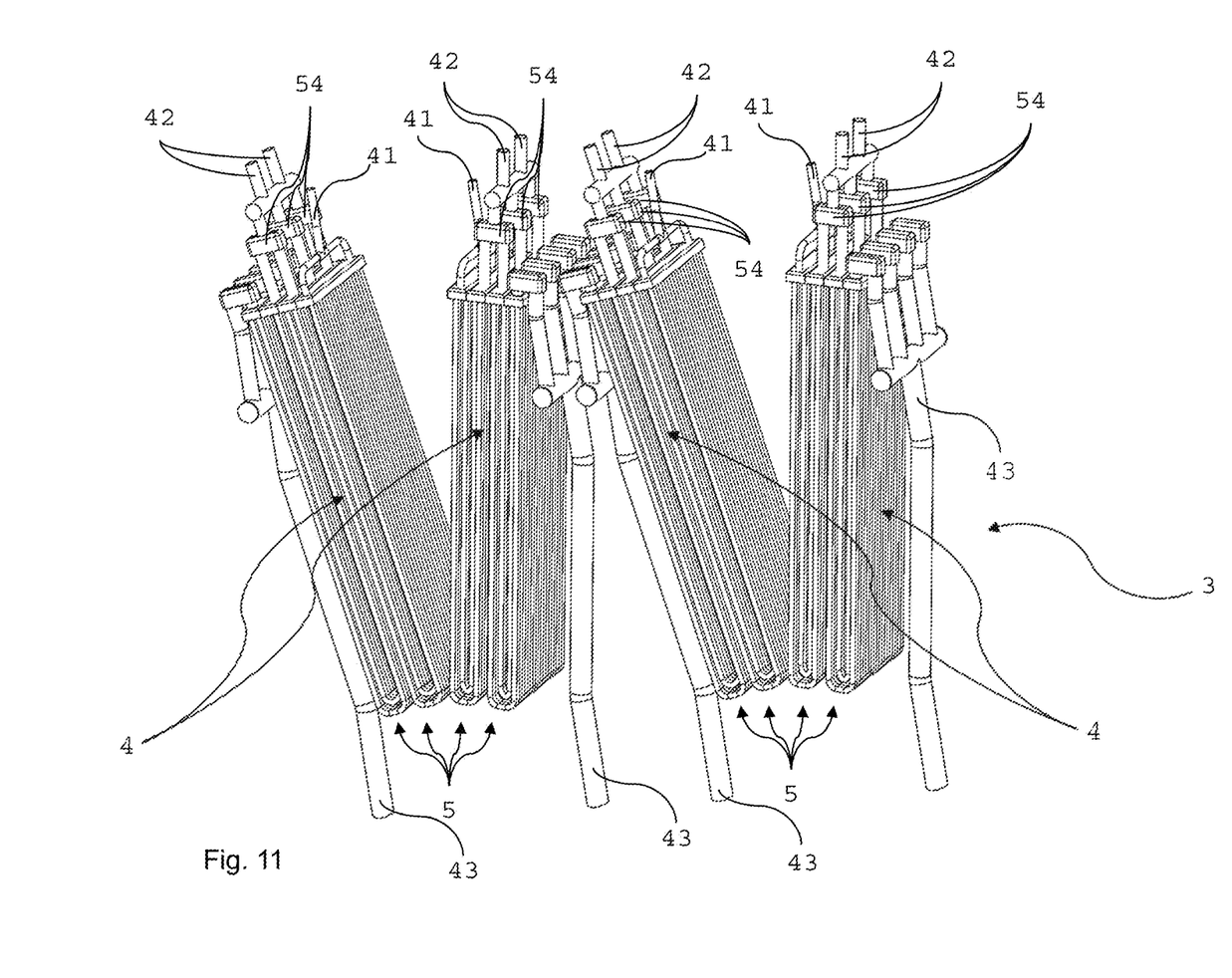
FIG. 11 shows a perspective view of two stack-pairs sown in FIG. 10 arranged in the mixing-evaporation module to form a W-shape assembly of four mixing-evaporation stacks.

FIG. 11 shows a further embodiment, wherein two stack-pairs are arranged in the mixing-evaporation module 1 to form a W-shape assembly of four mixing-evaporation stacks 4.

The embodiments of the two mixing-evaporation stacks 4 of the V-shape stack-pair(s) shown in FIGS. 3, 4, 10 and 11 do not show deflectors. They may be connected to one another in a leak-tight manner by a deflector as further shown in FIG. 12.

The figures again show the hierarchical modularity of the present invention.

Figure 12:
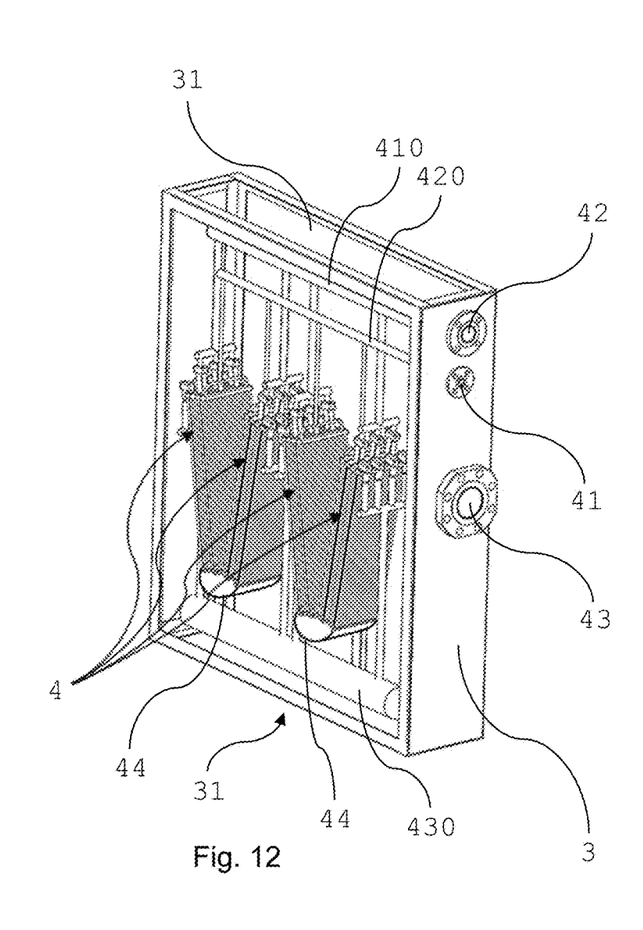
FIG. 12 shows a perspective view of an individual mixing evaporation module to be inserted into the housing of the combined evaporator and mixer.

As can be seen from the FIG. 12, the individual mixing-evaporation module 3 having heating gas openings 31 at two of its ends and comprising four heat transfer stacks 4. The mixing gas inlet 42, the liquid inlet 41 and mixed gas outlet 43 are arranged on the same side of the mixing-evaporation module 3. The mixing gas inlet 42 and the liquid inlet 41 are connectable to corresponding distribution manifolds 11, 12 and the mixed gas outlet 43 is connectable to a mixed gas collector 13, the distribution manifolds 11, 12 and the mixed gas collector 13 being situated outside of the mixing-evaporation module 3. The connections of the mixing gas inlet 42 and of the liquid inlet 41 to the corresponding distribution manifolds 11, 12 and the connection of the mixed gas outlet 43 to the mixed gas collector 13 of each individual mixing-evaporation module 3 are capable of being shut off for each mixing-evaporation module 3 independently. The connecting pipes 410, 420 of the liquid inlet 41 and of the mixing gas inlet 42 are particularly arranged after the hot gas crosses the mixing-evaporation stack 4 in the mixing-evaporation module 3. This arrangement allows for a pre-heating of the cold liquid and the cold mixing gas before entering the mixing-evaporation stack 4. The connecting pipe 430 of the mixed gas outlet 43 is particularly arranged before the hot gas crosses the mixing-evaporation stack 4, thereby further heating the formed mixed gas leaving the mixing-evaporation module 3. In this embodiment, the two mixing-evaporation stacks 4 of the V-shape stack-pair are connected to one another in a leak-tight manner by a deflector 44. The two stack-pairs of the W-shape assembly are also connected to one another in a leak-tight manner.

Figure 13:
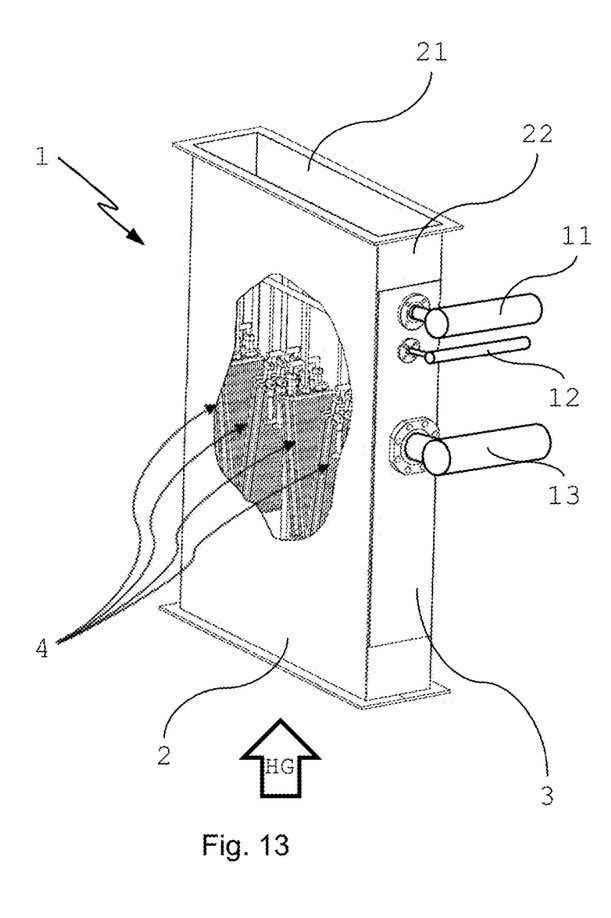
FIG. 13 shows a perspective view of a combined evaporator and mixer comprising one mixing evaporation module according to an additional embodiment of the invention.
Figure 14:
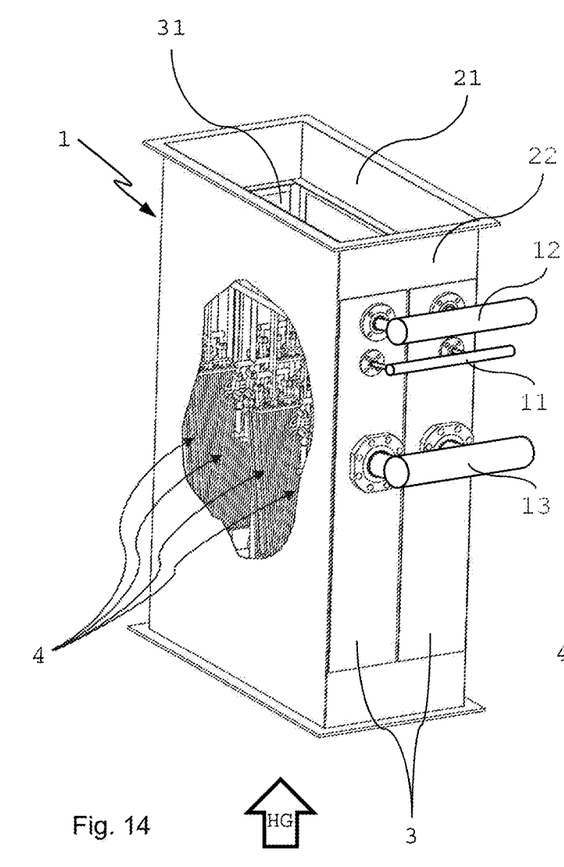
FIG. 14 shows a perspective view of a combined evaporator and mixer comprising two mixing evaporation modules according to a further embodiment of the invention.
Figure 15:
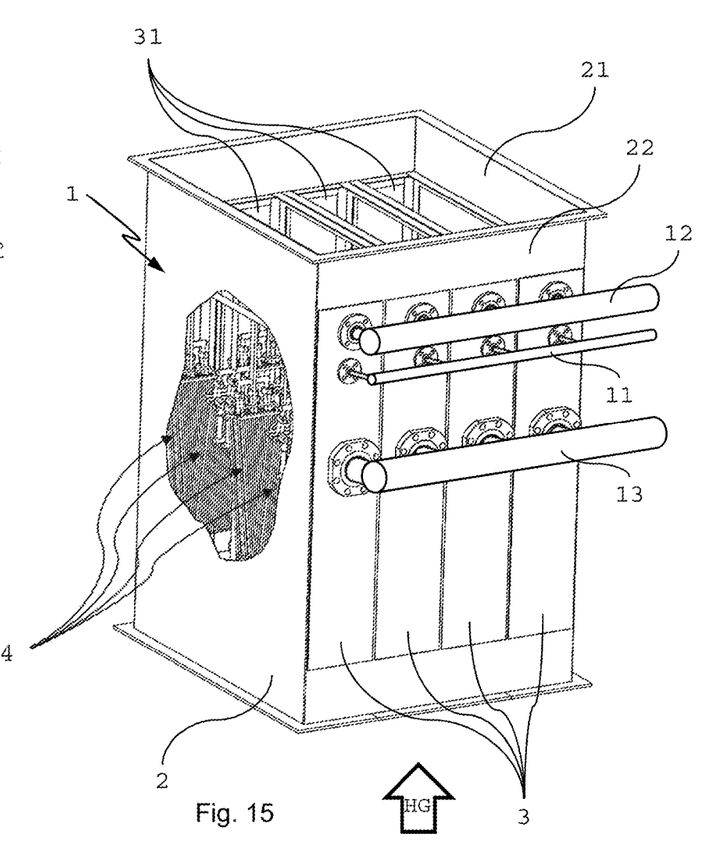
FIG. 15 shows a perspective view of a combined evaporator and mixer comprising four mixing evaporation modules according to another embodiment of the invention.

The mixing-evaporation module 3 shown in FIG. 12 is insertable into a housing 2 for forming the combined evaporator and mixer as shown in FIGS. 13 to 15.

The housing 2 receives individual mixing-evaporation modules 3, in the embodiments shown the housing receives one, two or four individual mixing-evaporation modules 3 and has heating gas openings 21 at two of its ends for allowing hot gas to pass through the mixing-evaporation modules 3. The housing 2 comprises openings in one of its sidewall 22 for inserting or removing the mixing-evaporation modules 3 independently. Furthermore, the housing 2 particularly comprises rails (not shown) arranged so to enable insertion and removal of the mixing-evaporation modules 3.

FIGS. 13 to 15 show the combined evaporator and mixer 1 comprising one, two or four mixing evaporation modules 3 according to various embodiment of the invention.

From the view of the combined evaporator and mixer 1 shown in FIGS. 13 to 15, the working principle of the combined evaporator and mixer 1 becomes evident. Hot gas, e.g. exhaust gas coming from a gas turbine (not shown) or from any other exhaust flows through the combined evaporator and mixer 1 as indicated by the respective arrow HG. At the same time, a liquid fluid to be evaporated, e.g. water, flows from the liquid inlet manifold 12 through the liquid inlet 41 to the inlet manifold 52 and then distributed to the U-shaped heat transfer tubes 51 of the first heat transfer cell 5a.

The hot gas enters the mixing-evaporation stack 4 by passing along the heat transfer tubes 51 of the last heat transfer cell 5b, thereby heating up the gaseous fluid mixture and exits the mixing-evaporation stack 4 by passing along the heat transfer tubes 51 of the first heat transfer cell 5a, thereby heating up the liquid to be evaporated.

Each time the hot gas HG comes into contact with the tubes 51 through which the initially liquid fluid LF flows, heat is transferred from the hot gas HG through the walls of the heat transfer tubes 51 to the initially liquid fluid LF which heats up and eventually undergoes the transfer into the gaseous state, now labeled evaporated fluid EF. The fluid is heated until it reaches its highest temperature and exits the heat transfer tube 51 over the tube outlets 512 into the respective outlet manifold 53.

At this point, due to the construction of the combined evaporator and mixer 1 and the operation conditions in this embodiment, the liquid fluid LF is completely in gaseous state when entering the connecting channel piece 54 towards the second heat transfer cell 5. In the embodiment shown in this figure, the mixing gas inlet 42 is arranged on the connecting channel piece 54 connecting the outlet manifold 53 of the first heat transfer cell 5a and the inlet manifold 52 of the second heat transfer cell 5 of the mixing-evaporation stack 4.

The initially liquid fluid LF being entirely in gaseous state when entering into contact with the mixing gas, excellent mixing quality is obtained. The mixed gas MG enters the second heat transfer cell for further being heated up and mixed by heat exchange between the hot gas HG through the heat transfer tube walls and the mixed gas MG until the mixed gas MG reaches its highest temperature and exits the mixing-evaporation stack 4 through the mixed gas outlet 43.

In case the liquid fluid LF is not completely in gaseous state after leaving the first heat transfer cell 5a due to constructional and operational conditions, an additional heat transfer cell 5 may be incorporated into the mixing-evaporation stack 4. In this case, a mixture of liquid fluid LF and of evaporated fluid EF will leave the first heat transfer cell 5a through the tube outlets 512 of the heat transfer tubes 51 of the first heat transfer cell 5a and will be directed through a connecting channel piece 54 into heat transfer tubes 51 of a second, additional heat transfer cell 5 for completing the evaporation process. In this case, the mixture of liquid fluid LF and evaporated fluid EF will further be exposed to the hot gas HG and heat is transferred from the hot gas HG through the walls of the heat transfer tube 51 to the fluid mixture LF and EF, thereby evaporating the remaining liquid fluid LF portion. In this embodiment, the initially liquid fluid LF will have undergone complete phase transition to evaporated fluid when leaving the second heat transfer cell 5 and entering the connecting channel piece 54 towards the third heat transfer cell 5 of the mixing-evaporation stack 4. In this embodiment with three heat transfer cells 5 in the mixing-evaporation stack 4, the mixing gas inlet 42 is arranged on the connecting channel piece 54 connecting the outlet manifold 53 of the second heat transfer cell 5 and the inlet manifold 52 of the third heat transfer cell 5 of the mixing-evaporation stack 4. The mixed gas MG formed by the contact of the mixing gas introduced through the mixing gas inlet 42 with the evaporated fluid EF will then enter the third heat transfer cell 5 of the mixing-evaporation stack 4 for further being heated up and mixed until the mixed gas MG reaches its highest temperature and exits the mixing-evaporation stack 4 through the mixed gas outlet 43.

The mixed gas outlet 43 is connected to a mixed gas collector 13 which is then guided towards the hot gas HG inlet 21 of the housing 2 of the combined evaporator and mixer 1 until leaving the housing 2, thereby further heating up the mixed gas MG passing through the mixed gas collector 13.

Alternatively, in another embodiment of the individual heat transfer cell according to the invention, the heat transfer cell comprises a plurality of separate individual heat transfer tubes which do not have a U-shaped form, but may be straight or half bent parts. In case the individual heat transfer tubes do have tube inlets and tube outlets on opposite sides, the heat transfer cell will have an upper manifold and a lower manifold. In this case, the outlet of the heat transfer tubes of the first heat transfer cell are connected to the lower manifolds and the lower manifold of the first heat transfer cell is connected to the lower manifold of the second heat transfer cell through connecting channel pieces. The upper manifold of the second individual heat transfer cell is then connected to the upper manifold of the third separate heat transfer cell through connecting channel pieces. This assembly continues until all individual heat transfer cells are connected. Thus, a series arrangement of heat transfer cells is formed. Within one individual heat transfer cell, the tube Inlet are connected to the upper manifold of said heat transfer cell while the tube outlets of the heat transfer tubes are connected to the lower manifold of said heat transfer cell, respectively.

Having described specific embodiments of the combined evaporator and mixer according to the invention, it is to be understood that these embodiments are not intended to limit the scope of protection to these embodiments, since many modifications to these embodiments are conceivable without departing from the spirit of the present invention. Accordingly, the scope of protection is intended to be defined by the appended claims.

The invention claimed is:

1. Combined evaporator and mixer for evaporating a liquid, and mixing with a gas, comprising a housing for receiving individual mixing-evaporation modules, the housing having heating gas openings at two of the housing ends for allowing hot gas to pass through the mixing-evaporation modules, at least one individual mixing-evaporation module, the mixing-evaporation module comprising at least one mixing-evaporation stack, the at least one mixing-evaporation stack having at least two individual heat transfer cells comprising a first heat transfer cell and a last heat transfer cell, wherein the at least two individual heat transfer cells comprise a plurality of heat transfer tubes, each heat transfer tube having a tube inlet and a tube outlet, the tube inlets being connected to an inlet manifold and the tube outlets being connected to an outlet manifold, and wherein the heat transfer tubes are laterally adjacently arranged in at least one heat transfer tube row, wherein the at least two heat transfer cells are arranged one beside the other in at least two laterally adjacent heat transfer cell rows, and the manifolds of adjacently arranged heat transfer cells are connected to one another through at least one connecting channel piece in a manner so as to form a series arrangement of heat transfer cells forming the at least one mixing-evaporation stack, wherein the at least one mixing-evaporation stack further comprises at least one liquid inlet to the first heat transfer cell, for introducing the liquid to be evaporated into the mixing-evaporation stack, as well as at least one mixing gas inlet for introducing a gas to be mixed with the evaporated liquid into the at least one mixing-evaporation stack, and at least one mixed gas outlet from the last heat transfer cell for the gaseous fluid mixture to leave the at least one mixing-evaporation stack, the at least one mixing gas inlet being connected to the at least one mixing-evaporation stack at a location between the heat transfer tube outlets of the first heat transfer cell and the heat transfer tube inlets of the last heat transfer cell of each of the at least one mixing-evaporation stack.

2. Combined evaporator and mixer according to claim 1, wherein the mixing gas inlet is connected to the at least one mixing-evaporation stack on at least one connecting channel piece, connecting one heat transfer cell to the adjacent heat transfer cell.

3. Combined evaporator and mixer according to claim 1 wherein the at least one individual mixing-evaporation module comprises at least two individual mixing-evaporation modules.

4. Combined evaporator and mixer according to claim 1, wherein the liquid inlet is arranged on the inlet manifold, the mixing gas inlet is arranged on at least one connecting channel piece connecting one heat transfer cell to the adjacent heat transfer cell and the mixed gas outlet is arranged on the outlet manifold.

5. Combined evaporator and mixer according to claim 1, wherein the heat transfer tubes of the respective heat transfer cell are U-shaped, wherein the outlet manifold of the respective heat transfer cell is arranged adjacently to the inlet manifold of the same heat transfer cell.

6. Combined evaporator and mixer according to claim 1, wherein the liquid inlet and the mixing gas inlet are connectable to corresponding distribution manifolds and the mixed gas outlet is connectable to a mixed gas collector, the distribution manifolds and the mixed gas collector being situated outside of the mixing-evaporation module.

7. Combined evaporator and mixer according to claim 6, wherein the connections of the liquid inlet and the mixing gas inlet to the corresponding distribution manifolds and the connection of the mixed gas outlet to the mixed gas collector of each individual mixing-evaporation module situated outside of the mixing-evaporation module are capable of being shut off for each mixing-evaporation module independently.

8. Combined evaporator and mixer according to claim 1, wherein the liquid inlet, mixing gas inlet and mixed gas outlet are arranged on the same side of the mixing-evaporation module.

9. Combined evaporator and mixer according to claim 1, wherein the at least one mixing-evaporation stack comprises two mixing-evaporation stacks being arranged in the mixing-evaporation modules so to form an angle a of from 0° to 45° with the exhaust gas openings of the mixing-evaporation modules.

10. Combined evaporator and mixer according to claim 1, wherein the at least one mixing-evaporation stack comprises two mixing-evaporation stacks being arranged to form a V-shape stack-pair.

11. Combined evaporator and mixer according to claim 10, wherein the at least one mixing-evaporation stack comprises at least four mixing-evaporation stacks, wherein at least two mixing-evaporation stack-pairs are arranged in the mixing-evaporation module to form a W-shape assembly.

12. Combined evaporator and mixer according to claim 1, wherein the mixing gas inlet comprises an ejector.

13. Method for evaporating a liquid and mixing the evaporated liquid with a mixing gas, wherein the step of evaporation and mixing is performed by using the combined evaporator and mixer according to claim 1, wherein the liquid to be evaporated is introduced into the first heat transfer cell of the at least one mixing-evaporation stack in the mixing-evaporation module and the mixing gas is introduced after the first heat transfer cell and before the last heat transfer cell, wherein the mixing-evaporation module is heated by a hot gas stream, wherein the hot gas stream is an exhaust gas stream.

14. Method according to claim 13, wherein the liquid to be evaporated is at least one of water or deionized water, and the mixing gas is natural gas.

15. Method according to claim 13, wherein the hot gas enters the at least one mixing-evaporation stack by passing along the heat transfer tubes of the last heat transfer cell, thereby heating up the gaseous fluid mixture and exits the at least one mixing-evaporation stack by passing along the heat transfer tubes of the first heat transfer cell, thereby heating up the liquid to be evaporated.

\* \* \* \* \*